(No Model.)
G. B. FRALEY & A. B. PAULSON.
ELECTRIC HEATER.
No. 585,311.   Patented June 29, 1897.
2 Sheets—Sheet 1.
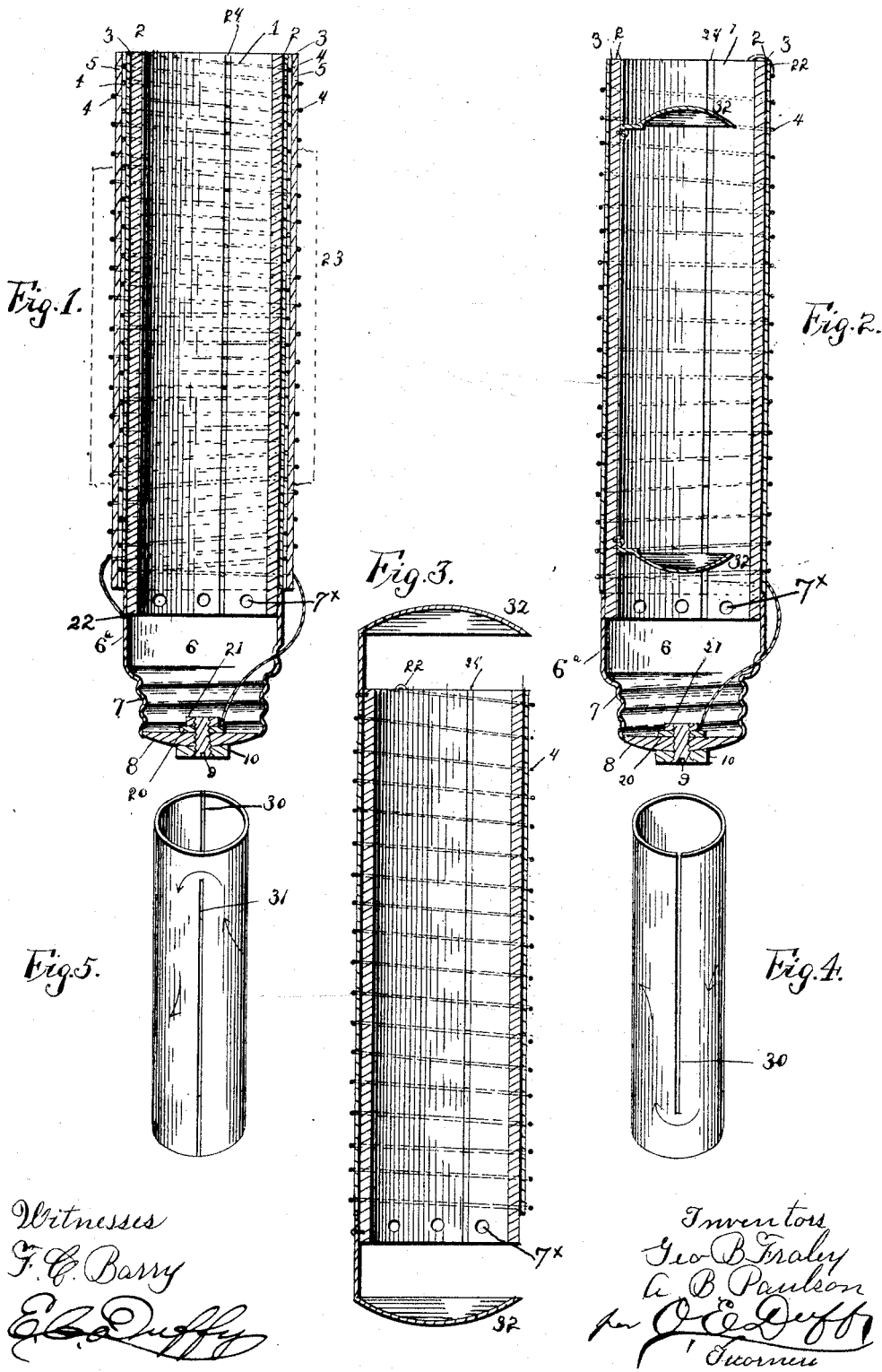

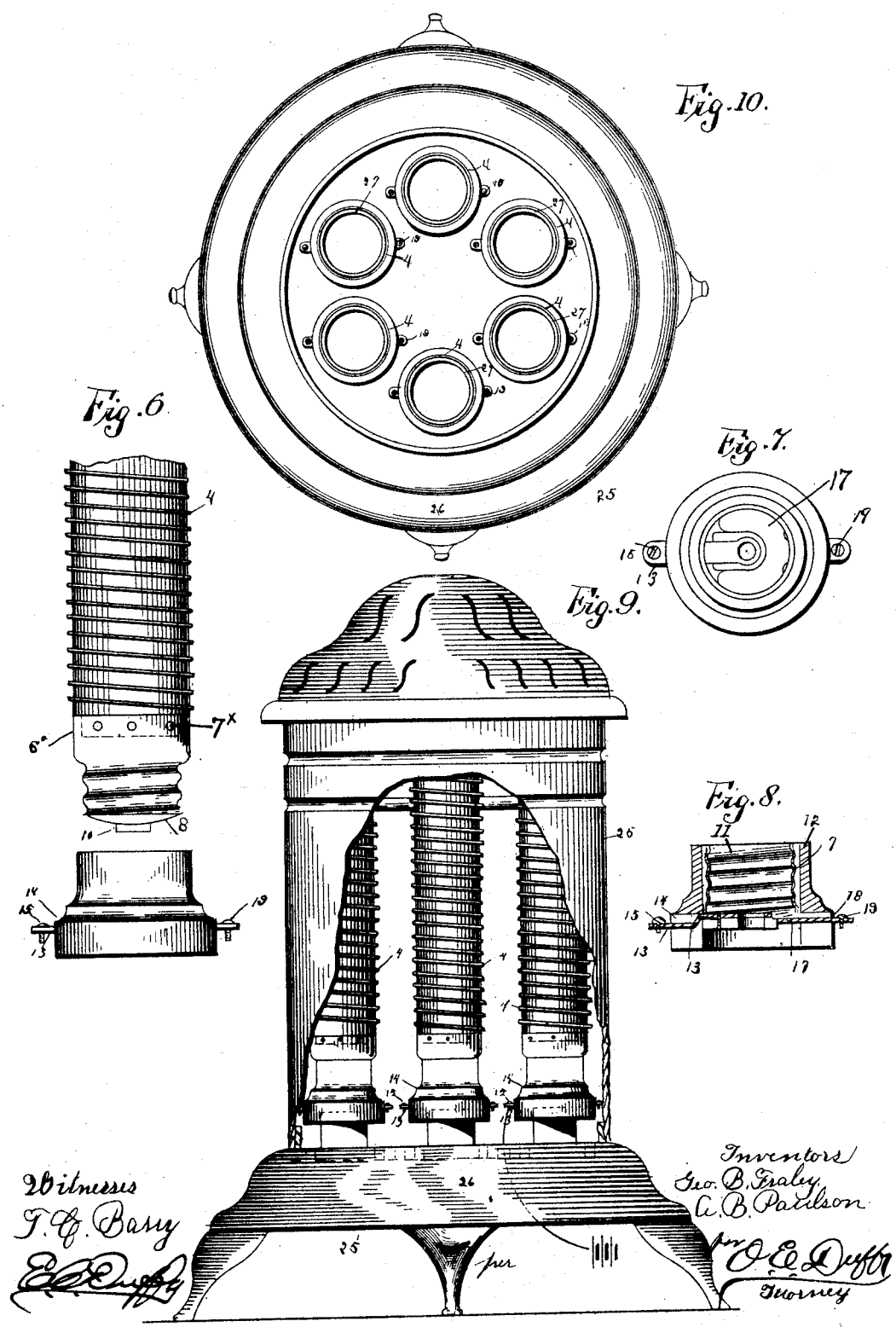

UNITED STATES PATENT OFFICE.

GEORGE B. FRALEY AND AMOS B. PAULSON, OF PHILADELPHIA, PENNSYLVANIA, ASSIGNORS TO THE GLOBE ELECTRIC HEATING COMPANY, OF SAME PLACE.

ELECTRIC HEATER.

SPECIFICATION forming part of Letters Patent No. 585,311, dated June 29, 1897.

Application filed September 21, 1896. Serial No. 606,536. (No model.)

*To all whom it may concern:*

Be it known that we, GEORGE B. FRALEY and AMOS B. PAULSON, of Philadelphia, in the county of Philadelphia and State of Pennsylvania, have invented certain new and useful Improvements in Electric Heaters; and we do hereby declare that the following is a full, clear, and exact description of the invention, which will enable others skilled in the art to which it appertains to make and use the same, reference being had to the accompanying drawings, and to the numerals of reference marked thereon, which form part of this specification.

This invention relates to electric heaters, and has for its objects to simplify their construction, increase their effectiveness, and at the same time adapt them for use with either a direct or alternating current, as may be desired.

With these objects in view the invention consists in the improved construction, arrangement, and combination of parts hereinafter fully described, and specifically pointed out in the claims.

In the accompanying drawings, Figure 1 is a longitudinal vertical sectional view of a core for direct current and attachments, the position of the insulating and protecting cover being shown in dotted lines. Fig. 2 is a similar view of the same parts with two reflectors in position inside the tubular core. Fig. 3 is a similar view of the same parts in a modified form, the reflectors being mounted beyond the ends of the tubular core. Figs. 4 and 5 are views in opposite side elevations of a modified form of core for use with an alternating current. Fig. 6 is a view in side elevation of the lower portion of a core and attachments and the base on which it is to be mounted and through which the connections with core and coils are made. Fig. 7 is a bottom plan view of the base. Fig. 8 is a central vertical sectional view of the same. Fig. 9 is a view in elevation of a heater composed of a battery of coils, part of the jacket being broken away; and Fig. 10 is a top plan view of the same.

Like numerals of reference mark the same parts wherever they occur in the various figures of the drawings.

Referring to the drawings by numerals, 1 is a tubular core, of copper or other suitable material. There are illustrated in the drawings three forms of cores, one being intended for use with a direct current and illustrated in detail in Figs. 1, 2, and 3 and two for use with an alternating current and illustrated in Figs. 4 and 5.

The cores are covered with a sheet of mica, as at 2, and a sheet 3 of asbestos or other nonconductor, around which is coiled any desired number of wires 4. In all the figures which illustrate the wires but one wire is shown, except in Fig. 1, in which two are shown. The black line next to the core is intended to illustrate the mica, and where two or more coiled wires are used, as in Fig. 1, the separate coils may be separated by sheets of asbestos, as shown at 5 in Fig. 1.

6 is a metal cap made at $6^a$ of a sufficient diameter to embrace the lower end of the core, for which purpose the core extends slightly below its coverings. The cap 6 is of reduced diameter below the part $6^a$ and formed with a screw-thread, as at 7, the lower end being closed by a perforated head 8, of porcelain or other insulating material. Through the perforation of the head 8 is passed a screw 9, which is provided with a large head (or a washer under the head) 10.

The screw-thread 7 of cap 6 engages in a similarly-threaded metal thimble 11 in a base 12, formed of porcelain or other insulating material, (see Figs. 7 and 8,) which engages a metal plate 13, extending out through an opening 14 in said base 12 and provided at its outer end with a suitable binding-screw 15. The head 10 of screw 9 comes in contact with another plate 17, which extends through an opening 18 in the opposite side of base 12 and having at its outer end a suitable binding-screw 19. The inner end of the screw 9 inside of the porcelain head 8 is formed as a binding-screw to engage the lower end of the coiled wire 4, in this instance, Figs. 1 and 2, being provided with a washer 20 and nut 21, between which the wire is clamped.

By means of the construction described a complete circuit is formed, the wire from the electric supply being engaged by binding-screw 19, the current passing through plate 17, screw 9, into and through the conductors 4, which are continuous and extend in Fig. 1 first upwardly and then downwardly around the exterior insulation 5, the contact being made with the cap 6 at the point 22, thence by the binding-screw 15.

In Fig. 2 but one coil of wire is shown. Here the upper end of the wire is connected at 22 to the upper end of the core 1.

The core, wires, &c., are covered with any suitable coating of a good heat-conducting but insulating substance, as shown by dotted lines at 23, Fig. 1. The current passing through the wires and core, as described, generates a high degree of heat therein, and air at normal temperature entering the ports $7^x$ in the lower portion of the core becomes highly heated in its passage therethrough prior to its exit at the top of said core.

A heater may be composed of a single core and its appurtenances, as described, or a number of cores may be connected, as shown in Figs. 9 and 10, and used as a battery, being inclosed by a jacket 25 and mounted on a suitable base 26.

The core described is intended for use with a direct current, and it may be slotted from end to end, as at 24, Fig. 1, to provide for expansion and contraction from heat and cold.

In the construction seen in Figs. 4 and 5 the cores seen therein are in practice surrounded by a primary coil, an induced current being created in said cores in the manner already described. The cores seen in Figs. 4 and 5 are slotted from the top nearly to the bottom at 30 and on the opposite side from the bottom nearly to the top at 31, whereby a free expansion and contraction is permitted, and since the core is not slotted continuously from end to end a secondary current is created, as already described, in the direction of the arrows.

32 designates suitable reflectors. (Best seen in Figs. 2 and 3.) In Fig. 3 these reflectors are secured to the core 1 so that they are removed a suitable distance from each extremity of said core. This arrangement largely increases the heating capacity; but a still better result is attained by the arrangement shown in Fig. 2, in which the reflectors are placed inside the core near the opposite ends thereof, their concave faces opposite to each other.

It will be seen from the foregoing that the underlying feature of our invention is a core or tube with a resistance wound thereon, said tube being open at both ends, so that air may flow therethrough, and provided with means for retarding the flow of said air. The heater gives up units of heat by radiation and convection, it being apparent that if the tube had an unobstructed passage therethrough the large quantity of air flowing therethrough, acting as a heat vehicle, will carry away so many units of heat as to reduce the temperature of the resistance to such an extent as to impair its efficiency. The above conditions are avoided by retarding the flow of air through the core, so as to prevent the maximum number of heat-units from being carried away by convection, this retardation being effected by the employment of one or more reflectors suitably supported upon said core. The detention of the air within the tube prevents the fall of temperature in the resistance itself and thereby reduces the current; but the temperature of the resistance is not liable to rise to an undesirable degree, since the hotter the air becomes the greater will be its buoyancy and velocity and the greater the number of heat-units removed from the interior of the heater. The reflectors employed, being preferably of metal, become highly heated and serve as baffle-plates for the purpose of retaining the heated air within the core as long as possible.

It will of course be evident that any suitable material may be employed in the construction of the core 1 and that, if desired, the reflectors 32 may be concaved and polished, as well as the interior of the core, but we do not desire to be restricted thereto in every instance. It will further be apparent that changes may be made by those skilled in the art which will come within the scope of our invention, and we do not therefore desire to be limited in every instance to the exact construction we have herein shown and described.

What we claim is—

1. In an electric heater, the combination of a slotted core, and a resistance-coil, wound around said core.

2. In an electric heater, the combination of a metallic core, slotted for a portion of its length and an insulated resistance-coil wound around said core.

3. In an electric heater, a core, having a plurality of slots therein, beginning alternately at opposite ends, the length of said slots being less than the length of said core, the latter forming a secondary circuit and an insulated primary coil surrounding said core.

4. In an electric heater, a core having a plurality of slots therein, beginning alternately at opposite ends, the length of said slots being less than the length of said core, the latter forming a secondary circuit, and a primary resistance-coil surrounding said core.

5. In an electric heater, the combination of a core, a resistance-coil, wound around said core, and a reflector suitably supported, adjacent an end of said core.

6. In an electric heater, the combination of a core, a resistance-coil wound around said core, and a reflector located adjacent each end of said core.

7. In an electric heater, the combination of a core, a resistance-coil wound around said core, and a reflector located within said core intermediate the ends thereof.

8. In an electric heater, the combination of a core, a resistance-coil wound around said core, and a concave reflector located near each end of said core, the concave surfaces of the reflectors facing each other.

In testimony that we claim the foregoing as our own we affix our signatures in presence of two witnesses.

GEORGE B. FRALEY.
AMOS B. PAULSON.

Witnesses:
JOHN F. TURNER,
ALBERT E. POTTS.